(12) United States Patent
Haggans et al.

(10) Patent No.: US 7,092,148 B1
(45) Date of Patent: Aug. 15, 2006

(54) OPTICAL COMMUNICATION SYSTEM HAVING DYNAMIC GAIN EQUALIZATION

(75) Inventors: Charles W. Haggans, Clarksville, MD (US); Jun Bao, Ellicott City, MD (US); Harshad Sardesai, Ellicott City, MD (US); Michael Y. Frankel, Baltimore, MD (US); Mahir Nayfeh, Catonsville, MD (US); Balakrishnan Sridhar, Ellicott City, MD (US); Vipul Bhatnagar, Kensington, MD (US)

(73) Assignee: Ciena Corporation, Linthicum, MD (US)

( * ) Notice: Subject to any disclaimer, the term of this patent is extended or adjusted under 35 U.S.C. 154(b) by 357 days.

(21) Appl. No.: 10/144,082

(22) Filed: May 13, 2002

Related U.S. Application Data

(60) Provisional application No. 60/353,482, filed on Feb. 1, 2002.

(51) Int. Cl.
*H01S 3/00* (2006.01)
(52) U.S. Cl. ................................. 359/337.11
(58) Field of Classification Search ............ 398/25–27; 359/337, 337.1, 337.11
See application file for complete search history.

(56) References Cited

U.S. PATENT DOCUMENTS 5,986,782 A * 11/1999 Alexander et al. ............ 398/26

(Continued)

OTHER PUBLICATIONS

Hiromu Toba, et al., "A 100-Channel Optical FDM Six-Stage In-Line Amplifier System Employing Tunable Gain Equalizers," IEEE Photonics Technology Letters, vol. 5, No. 2, Feb., 1993; pp. 248-251.

M. Birk, et al., "System Margin Enhancement in Terabit Capacity 40 Gb/s Systems Using an Integrated EDFA with Dynamic Gain Equalizer," OFC 2002, Mar., 2002, pp. 755-756.

J. L. Zyskind, et al.,"High Capacity, Ultra-Long Haul Transmission," Proc. NFOEC 2000.

S. F. Su, et al., Gain Equalization in Multiwavelength Lightwave Systems Using Acoustooptic Tunable Filters, IEEE Photonics Technology Letters, vol. 4, No. 3, Mar. 1992, pp. 269-271.

A. R. Pratt et al., Marconi, Coventry, UK: "5,745 km DWDM transcontinental field trial using 10 Gbit/s dispersion managed solitons and dynamic gain equalization," pp. PD26-1 to PD26-3.

Heather Patrick, Optinel Systems, Inc. USA: "Gain and Power Equalization," OFC 2003, Tuesday Afternoon, vol. 1, p. 244.

*Primary Examiner*—Deandra M. Hughes
(74) *Attorney, Agent, or Firm*—Merek, Blackmon & Voorhees, LLC

(57) ABSTRACT

An optical communication device, and related method, are provided for reducing ripple in WDM systems. In particular, the optical communication device includes a dynamic gain equalization (DGE) circuit is coupled to an optical communication path carrying the WDM optical signals. The DGE circuit adjusts the powers associated with each channel on a channel-by-channel basis so that the WDM optical signal has a desired power spectrum. The DGE is controlled in response to sense signals generated by an optical performance monitoring (OPM) circuit located downstream from the DGE or substantially co-located with the DGE. The OPM monitors the WDM spectrum for optical signal power variations and outputs the sense signal when the variations fall outside a given tolerance. Typically, one DGE is associated with a group of concatenated amplifiers so that multiple DGEs are provided in a system having many groups of such amplifiers. Likewise, multiple OPMs are provided in such systems, each corresponding to a respective DGE, so that ripple can be reduced and desired WDM optical signal powers can be achieved in the WDM system.

38 Claims, 10 Drawing Sheets

U.S. PATENT DOCUMENTS

| | | | |
|---|---|---|---|
| 6,271,945 B1 * | 8/2001 | Terahara ........................ | 398/26 |
| 6,323,993 B1 * | 11/2001 | Hansen et al. ............... | 359/337 |
| 6,429,962 B1 * | 8/2002 | Xu et al. .................. | 359/337.1 |
| 6,614,589 B1 * | 9/2003 | DeGrange et al. ....... | 359/341.4 |
| 6,621,625 B1 * | 9/2003 | Zhang et al. .......... | 359/341.42 |
| 6,731,424 B1 * | 5/2004 | Wu .......................... | 359/337.1 |
| 6,760,532 B1 * | 7/2004 | Livas et al. ................. | 385/140 |
| 2001/0019436 A1 * | 9/2001 | Nakajima et al. ........... | 359/110 |
| 2001/0026385 A1 * | 10/2001 | Cao ............................ | 359/124 |
| 2001/0055133 A1 * | 12/2001 | Yamaguchi et al. ........ | 359/110 |
| 2003/0067670 A1 * | 4/2003 | Pavel et al. ................. | 359/337 |
| 2003/0113058 A1 * | 6/2003 | Stayt ........................... | 385/24 |

* cited by examiner

OPTICAL COMMUNICATION SYSTEM HAVING DYNAMIC GAIN EQUALIZATION

CROSS REFERENCE TO RELATED APPLICATION

The present application claims the benefit of the filing date of U.S. Provisional Application No. 60/353,482, filed Feb. 1, 2002, the teachings of which are incorporated herein by reference.

BACKGROUND OF THE INVENTION

Wavelength division multiplexing (WDM) has been explored as an approach for increasing the capacity of fiber optic networks. In a WDM system, plural optical signals or channels are carried over a single optical fiber with each channel being assigned a particular wavelength. Such systems typically include a plurality of receivers, each detecting a respective channel by effectively filtering out the remaining channels.

Optical signals or channels in a WDM system are frequently transmitted over silica based optical fibers, which typically have relatively low loss at wavelengths within a range of 1525 nm to 1580 nm. WDM optical signal channels at wavelengths within this low loss "window" can be transmitted over distances of approximately 50–100 km without significant attenuation. For distances beyond 100 km, however, optical amplifiers are required to compensate for optical fiber loss.

Optical amplifiers have been developed which include an optical fiber doped with erbium. The erbium-doped fiber is "pumped" with light at a selected wavelength, e.g., 980 nm, to provide amplification or gain at wavelengths within the low loss window of the optical fiber. However, erbium doped fiber amplifiers do not uniformly amplify light within the spectral region of 1525 to 1580 nm. For example, an optical channel at a wavelength of 1540 nm, for example, is typically amplified 4 dB more than an optical channel at a wavelength of 1555 nm. While such a large variation in gain can be tolerated for a system with only one optical amplifier, it cannot be tolerated for a system with plural optical amplifiers or numerous, narrowly-spaced optical channels. In which case, much of the pump power supplies energy for amplifying light at the high gain wavelengths rather than amplifying the low gain wavelengths. As a result, low gain wavelengths suffer excessive noise accumulation after propagating through several amplifiers.

Accordingly, optical amplifiers providing substantially uniform spectral gain have been developed. In particular, optical amplifiers including an optical filter provided between first and second stages of erbium doped fiber are known to provide gain flatness. In these amplifiers, the first stage is operated in a high gain mode and supplies a low noise signal to the second stage, while the second stage is operated in a high power mode. Although the second stage introduces more noise than the first, the overall noise output by the amplifier is low due to the low noise signal of the first stage. The optical filter selectively attenuates the high gain wavelengths, while passing the low gain wavelengths, so that the gain is substantially equal for each wavelength output from the second stage.

These gain-flattening amplifiers are typically designed to receive optical signals at a particular power level. In the event the total power level of all optical signals input to the amplifier differs from the desired input level, the amplifier can no longer amplify each wavelength with substantially the same amount of gain. Accordingly, the conventional gain-flattened amplifiers discussed above are unable to receive input optical signals over a wide range of power levels while maintaining substantially uniform gain at each wavelength.

U.S. Pat. No. 6,057,959, incorporated by reference herein, discloses use of a variable optical attenuator provided between first and second stages of an optical amplifier to offset deviations in optical input power away from an optimal input power for which the amplifier is designed. Without the variable optical attenuator, the amplifier can suffer from "tilt", in which amplifier output power increase or decreases from one optical signal to the next such that power spectrum of the WDM signal has a uniform slope. By appropriately adjusting the variable optical attenuator, a substantially uniform spectral output can be achieved, or if desired a predetermined tilt can be achieved.

In so-called ultra-long haul WDM systems, relatively large numbers of optical amplifiers are provided between transmitters and receivers. Often twenty concatenated optical amplifiers are provided, spaced 50–100 km apart, to extend propagation distances 1000–3000 km. In such systems, however, a "ripple" phenomenon can occur in which slight power variations among the WDM signals are amplified as the signals pass through successive amplifiers. These power variations can stem from an unequal loss spectrum caused by badly mated connectors and tight fiber bends. At the receive end, the ripple can be relatively large such that low gain wavelengths can incur excessive noise accumulation. Conventional techniques discussed above are often ineffective in eliminating ripple.

Moreover, numerous transmission, as well as dispersion compensating, optical fibers, are currently available, each having its own loss spectrum. Accordingly, it is difficult to design an optical amplifier so that it will have a uniform output spectrum for every fiber type.

SUMMARY OF THE INVENTION

Consistent with the present, an optical communication device is provided having a dynamic gain equalization circuit coupled to an optical communication path. The optical communication path is configured to carry a plurality of optical signals, each of which being at a respective one of a plurality of wavelengths. The dynamic gain equalization circuit has an adjustable, wavelength dependent transmission spectrum, at least a portion of the transmission spectrum having a substantially non-uniform slope. An optical amplifier is further provided which is coupled to the optical communication path, and is configured to impart optical amplification to the plurality of wavelengths. In addition, an optical performance monitoring circuit is coupled to the optical communication path. The optical performance monitoring circuit is configured to sense the plurality of optical signals and generate a sense signal in response thereto. The transmission spectrum is adjusted in response to the sense signal.

Consistent with an additional aspect of the present invention, an optical communication method is provided, comprising the step of measuring a spectrum associated with a plurality of optical signals carried by an optical signals carried by an optical communication path, each of the optical signals being at a respective one of a plurality of wavelengths. The method further includes the steps of: determining a difference between the measured spectrum and a predetermined spectrum with respect to a parameter associated with said plurality of optical signals; and adjusting a power associated with each of the plurality of optical signals in response to the difference.

Consistent with a further aspect of the present invention, an optical communication method is provided comprising the steps of:

monitoring a plurality of optical signals propagating on an optical communication path, each of the plurality of optical signals being at a respective one of a plurality of wavelengths, the monitoring occurring at a first location along the optical communication path; further monitoring the plurality of optical signals at a second location along the optical communication path remote from the first location; detecting the presence of variation in power levels associated with the plurality of optical signals at the first and second locations in response to the monitoring and further monitoring, respectively; and adjusting the power levels at a third location along the optical communication path remote from the first and second locations to thereby offset at least a portion of said variation in the power levels.

BRIEF DESCRIPTION OF THE DRAWINGS

Advantages of the present invention will be apparent from the following detailed description of the presently preferred embodiments thereof, which description should be considered in conjunction with the accompanying drawings in which.

DETAILED DESCRIPTION OF THE PREFERRED EMBODIMENTS

An optical communication device, and related method, are provided for reducing ripple in WDM systems. In particular, the communication device includes a dynamic gain equalization (DGE) circuit coupled to an optical communication path carrying the WDM optical signals. The DGE circuit adjusts the powers associated with each channel on substantially a channel-by-channel basis so that the WDM optical signal has a desired power spectrum. The DGE is controlled in response to sense signals generated by an optical performance monitoring (OPM) circuit located downstream from the DGE. The OPM monitors the WDM spectrum for optical signal power variations and outputs the sense signal when the variations fall outside a given tolerance. Typically, one DGE is associated with a group of concatenated amplifiers so that multiple DGEs are provided in a system having many groups of such amplifiers. Likewise, multiple OPMs are provided in such systems, each corresponding to a respective DGE, so that ripple can be reduced and desired WDM optical signal powers can be achieved in the WDM system.

Figure 1:
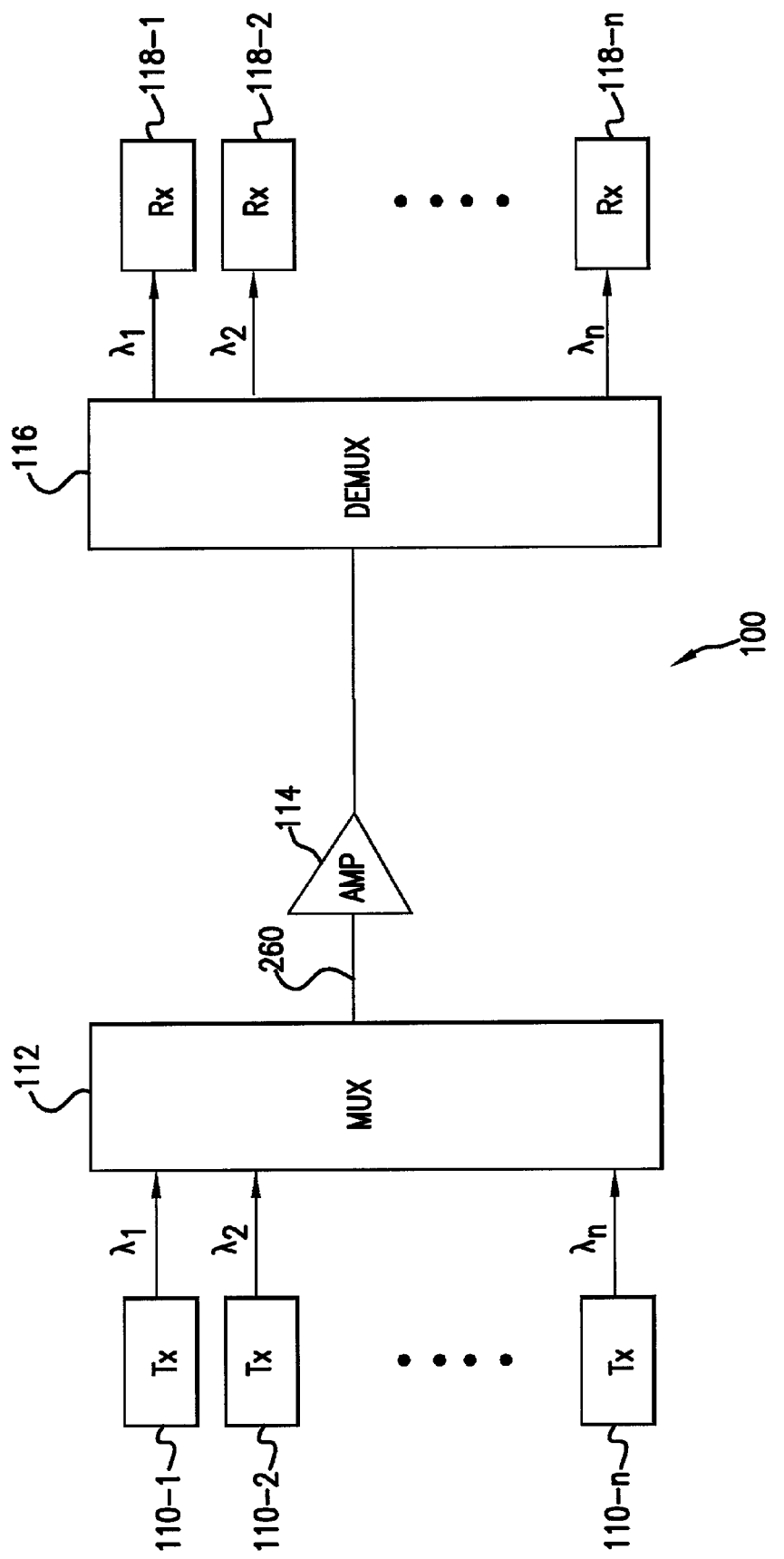
FIG. 1 illustrates a WDM optical communication system consistent a feature of the present invention.

Turning to the drawings in which like reference characters indicate the same or similar elements in each of the several views, FIG. 1 illustrates a WDM system 100 consistent with an aspect of the present invention. WDM system 100 includes a plurality of optical signal emitters 110-1 to 110-n, which can be similar to, if not the same as, transmitters or remodulators disclosed in U.S. Pat. No. 5,715,076, incorporated reference herein. Emitters 110-1 to 110-n each emit an optical signal at a corresponding one of a plurality of wavelengths $\lambda_1$ to $\lambda_n$. The optical signals are next combined onto optical communication path 260, including, for example, an optical fiber, by optical multiplexer or combiner 112. Optical communication path 260 can include one or more segments of conventional optical fiber, such as True-Wave Classic commercially available from Lucent Technologies, and LS and e-LEAF commercially available from Corning. Amplifier 114 shown in FIG. 1 is representative of a plurality of optical amplifiers coupled to optical communication path 260, to be discussed in greater detail below. DGE and OPM circuits (not shown in FIG. 1 for simplicity, but also discussed in greater detail below) are also coupled to optical communication path 260. After propagating through the span or substantially the length of optical communication path 260, the optical signals are separated by optical demultiplexer 116 and supplied to receiver circuits 118-1 to 118-n. Although shown separately in FIG. 1, the demultiplexer can include a plurality of in-fiber Bragg gratings packaged with a receiver circuit (including a photodiode, for example), which can be incorporated into a remodulator (as further discussed in U.S. Pat. No. 5,715,076). Demultiplexer 116 can also have a structure similar to that disclosed in U.S. Pat. No. 6,281,997, incorporated by reference herein.

Figure 2:
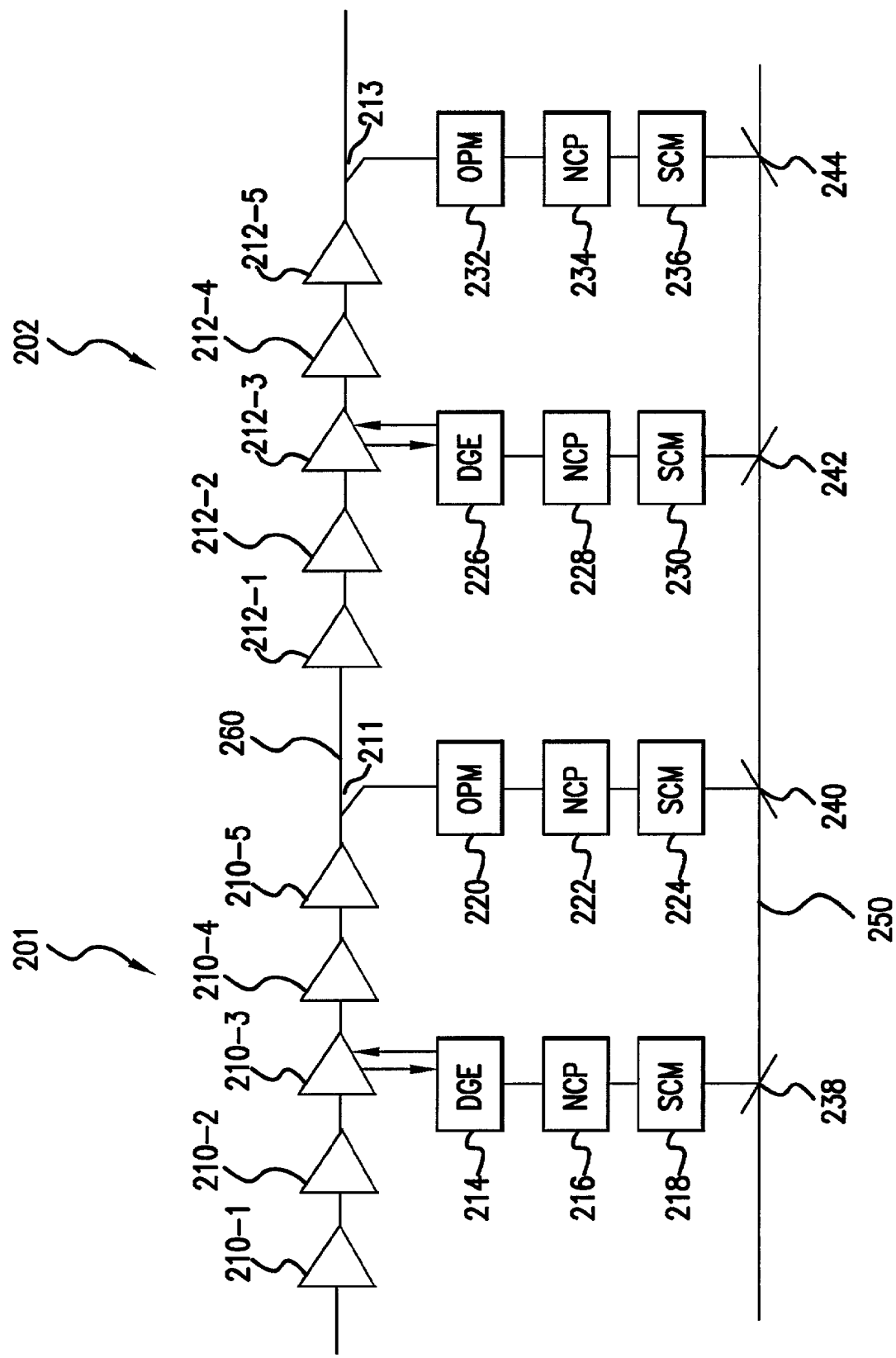
FIG. 2 illustrates sub-spans and associated circuitry and optical amplifiers within the optical communication system shown in FIG. 1.

FIG. 2 illustrates an arrangement including optical amplifiers 210-1 to 210-5 and 212-1 to 212-5, as well as other subsystems coupled along optical communication path 260. Optical amplifiers 210-1 to 210-5 form part sub-span 201. The output of the last optical amplifier, amplifier 210-5, in sub-span 201 is coupled to optical performance monitoring (OPM) circuit 220 via optical tap 211. As discussed in greater detail below, OPM 220 senses the optical signals, and generates a sense signal in response thereto. The sense signal is supplied to a conventional microprocessor otherwise referred to as a node control processor circuit (NCP) 222, which interprets the sense signal and determines appropriate control information to be supplied to upstream DGE 214 for equalizing the power of the optical signals and reducing ripple or achieving an otherwise desired power spectrum. The control information is supplied to a service channel modem (SCM) 224, which outputs an optical service channel having a wavelength (e.g., 1310 or 1625 nm) different than other user information channels propagating on optical communication path 250 having wavelengths at about 1550 nm. The service channel is supplied to path 250 via a conventional multiplexer, such as a filter 240, as disclosed in U.S. Pat. No. 5,532,864, incorporated by reference herein. The service channel propagates to filter 238 and is supplied to service channel modem 218, which outputs an electrical signal carrying the control information to NCP 216. The control information is then used to output an appropriate control signal to DGE 214 for adjusting the power levels of optical signal propagating in sub-span 201.

In a similar fashion, optical amplifiers 212-1 to 212-5 form part of sub-span 202. A portion of the WDM signal output from optical amplifier 212-5 is supplied to OPM 232, which outputs a sense signal in response thereto. DGE control information is generated by NCP 234 and supplied via SCM 236 to an optical service channel which is supplied to path 250 by filter 244. SCM 230 receives the service channel via filter 242 and supplies the control information to NCP 228, which then outputs a control signal to DGE 226 for appropriately equalizing optical signals within sub-span 202. Typically, the DGE is coupled to one of the centrally disposed amplifiers within a sub-span. Alternatively, the DGE can be coupled to an amplifier provided between two other amplifiers in the sub-span.

Figure 3:
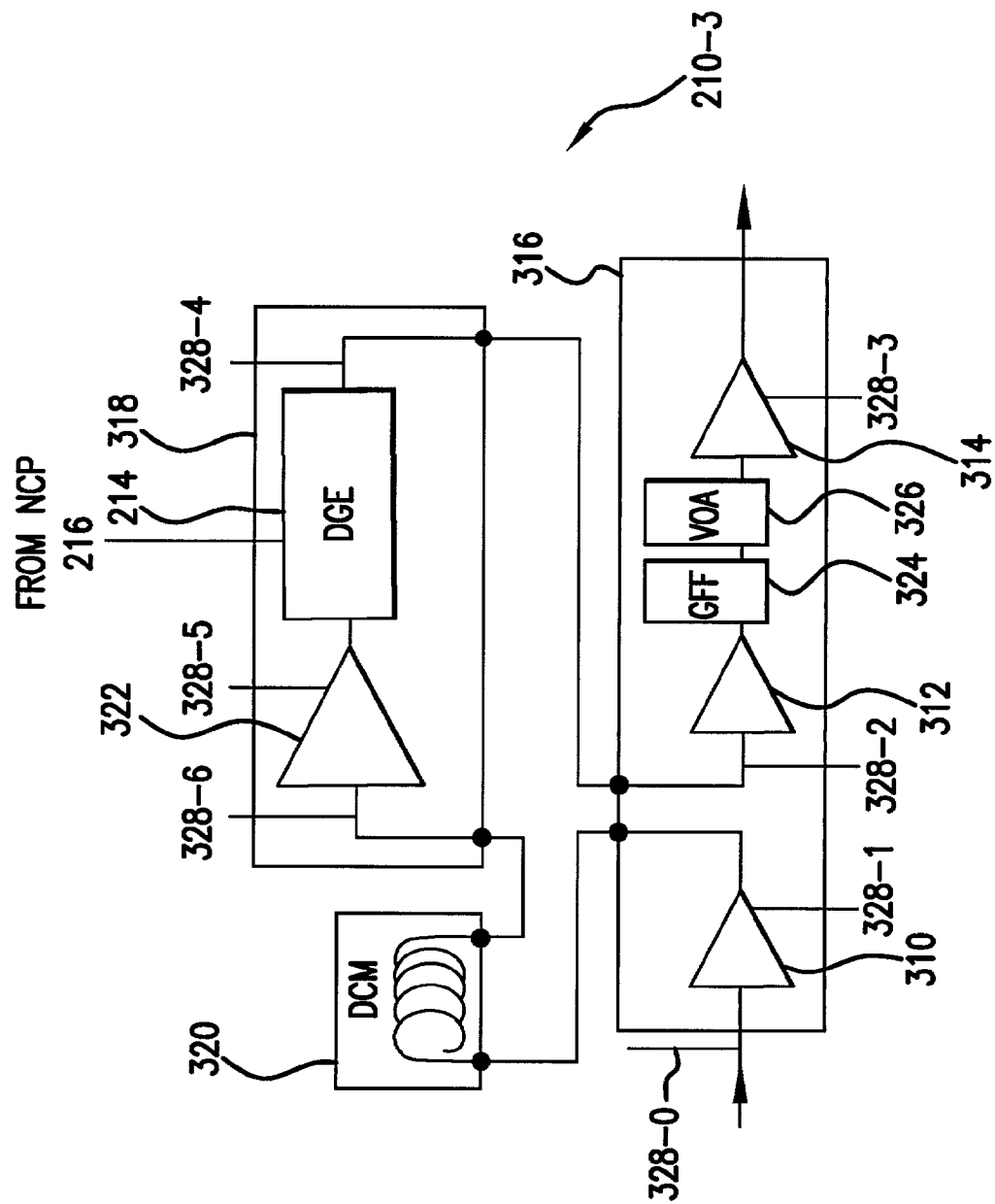
FIG. 3 illustrates a detailed schematic of an optical amplifier and associated dynamic gain equalization circuit consistent with a feature of the present invention.

FIG. 3 illustrates an optical amplifier 210-3 and associated connections to DGE 214 in greater detail. It is understood that amplifier 212-3 has a similar construction, as well as corresponding amplifiers in other sub-spans in system 100. Amplifier 210-3 typically has a first amplifier stage 310, including for example, a segment of optical fiber doped with a fluorescent impurities, e.g., erbium, and pumped with light sufficient to excite the impurities to thereby impart optical gain to the WDM optical signal. Such fibers and pump sources are disclosed, for example, in U.S. Pat. Nos. 5,696,615 and 5,778,132, incorporated by reference herein. Amplifier stage 310 receives the input WDM optical signals, and supplies an amplified WDM optical signal to dispersion compensating module (DCM) 320, which can include one or more segments of conventional dispersion compensating fiber to provide suitable dispersion compensation of the WDM optical signal. Next, the WDM optical signal is supplied to an additional amplifier stage 322, also including a segment of erbium doped fiber, for example, to further amplify the signal. The WDM optical signal is then output from amplifier stage 322 and fed to DGE 214.

Figure 4:
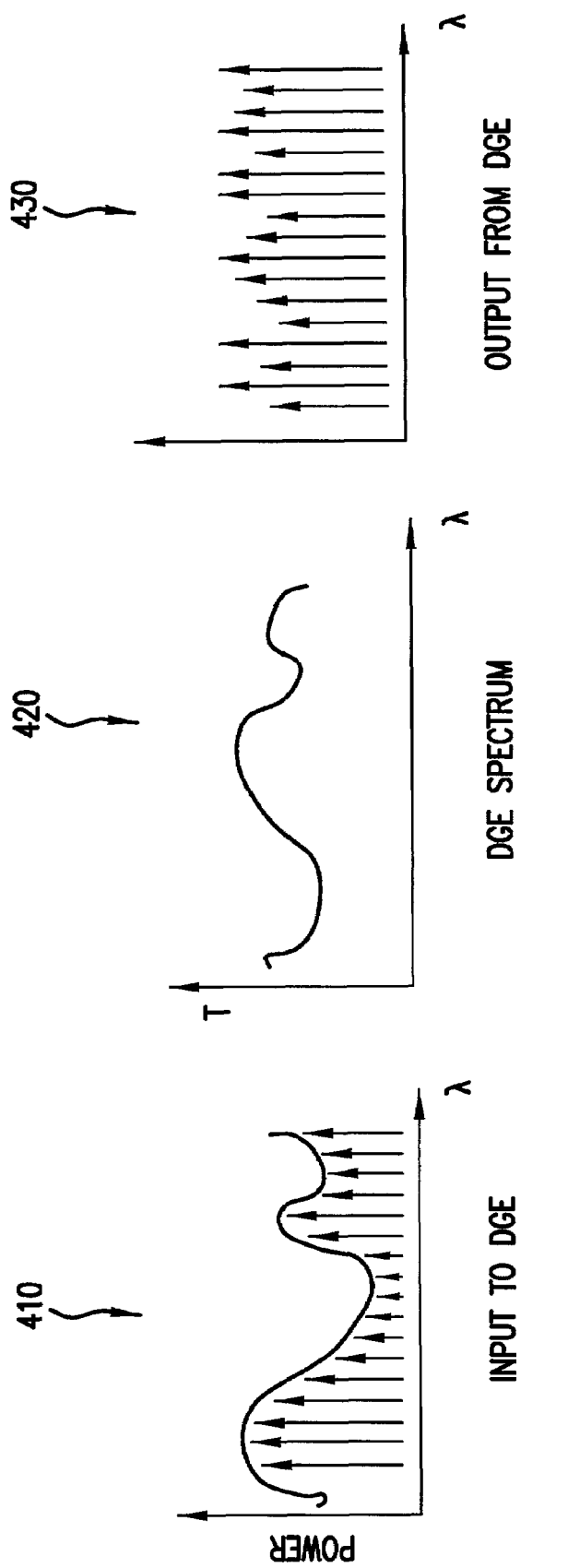
FIG. 4 illustrates operation of the dynamic gain equalization circuit shown in FIG. 3.

DGE 214 is commercially available from Lightconnect and JDS Uniphase, for example, and has a wavelength dependent transmission spectrum, at least a portion of the transmission spectrum being substantially non-linear. As shown in FIG. 4, optical signals (represented by arrows in the figure) having varying power levels conforming to spectrum 410 can be input to DGE 214. In response to a control signal from NCP 216, the transmission spectrum 420 associated with DGE 214 is adjusted to offset the power level variations of the input optical signals. As a result, optical signals output from DGE can be adjusted to have a desired spectrum, as seen in spectrum 430.

As further shown in FIG. 4, the slope of DGE spectrum 420 is not constant or has a substantially non-uniform slope over at least a portion of the spectrum, and the spectrum therefore has at least a portion that is non-linear. It should be noted, however, that the output spectrum of the DGE need not be uniform. Rather, any desired power spectrum can be obtained by appropriately controlling the transmission spectrum of the DGE. For example, if substantial ripple is measured by the OPM downstream from the DGE, the DGE can be adjusted to create a complementary ripple spectrum to cancel the original ripple. Accordingly, signals reaching the downstream OPM can be substantially ripple-free.

Returning to FIG. 3, optical signals output from DGE 214 are next supplied to a third amplification stage 312 for further amplification and to a gain-flattening filter (GFF) 324, which is often used to reduce amplified stimulated emission (ASE) light emitted by the amplification stages. GFF 324 is typically a static filter configured to selectively attenuate high gain channels at 1530 nm, the peak intensity wavelength of ASE light. The signals are then fed to a variable optical attenuator (VOA) 326, similar to that described in U.S. Pat. No. 6,057,959, noted above. VOA 326 uniformly attenuates the WDM optical signal and is provided to offset amplifier output deviations stemming from variations in input power to the amplifier. In addition, VOA 326 may be used to impart a tilt, or linear power variation across the WDM signals, if necessary. A final amplifier stage is provided to further amplify optical signals output from VOA 326. The signals then exit amplifier 210-3 and pass to amplifier 210-4 for further propagation.

In an alternative embodiment, the DGEs can be configured to substantially reduce ASE light at 1530 nm and across the C-band in conjunction with or instead of gain flattening filter 324 shown in FIG. 3. In particular, by controlling the DGE to attenuate those wavelengths not populated by information carrying channels, ASE can be substantially reduced. In this instance, the DGE can be controlled in accordance with the sense signals, or simply based on the location of channel wavelengths in the channel plan spectrum.

Optionally, optical monitor taps can be placed at locations 328-0 to 328-6. In addition, amplification stages 310, 312, 314 can be provided in a module 316 and housed separately from modules 320 and 318, each of which housing DCM 320 and DGE 214, respectively. Alternatively, each of the elements shown in FIG. 3 can be provided in a single module. In addition, one or all of amplification stages could be configured to impart Raman amplification instead of or in conjunction with the erbium fiber based amplification discussed above. Raman amplification can also be provided, for example, by suitably pumping optical communication path 260 in a known manner.

Figure 5:
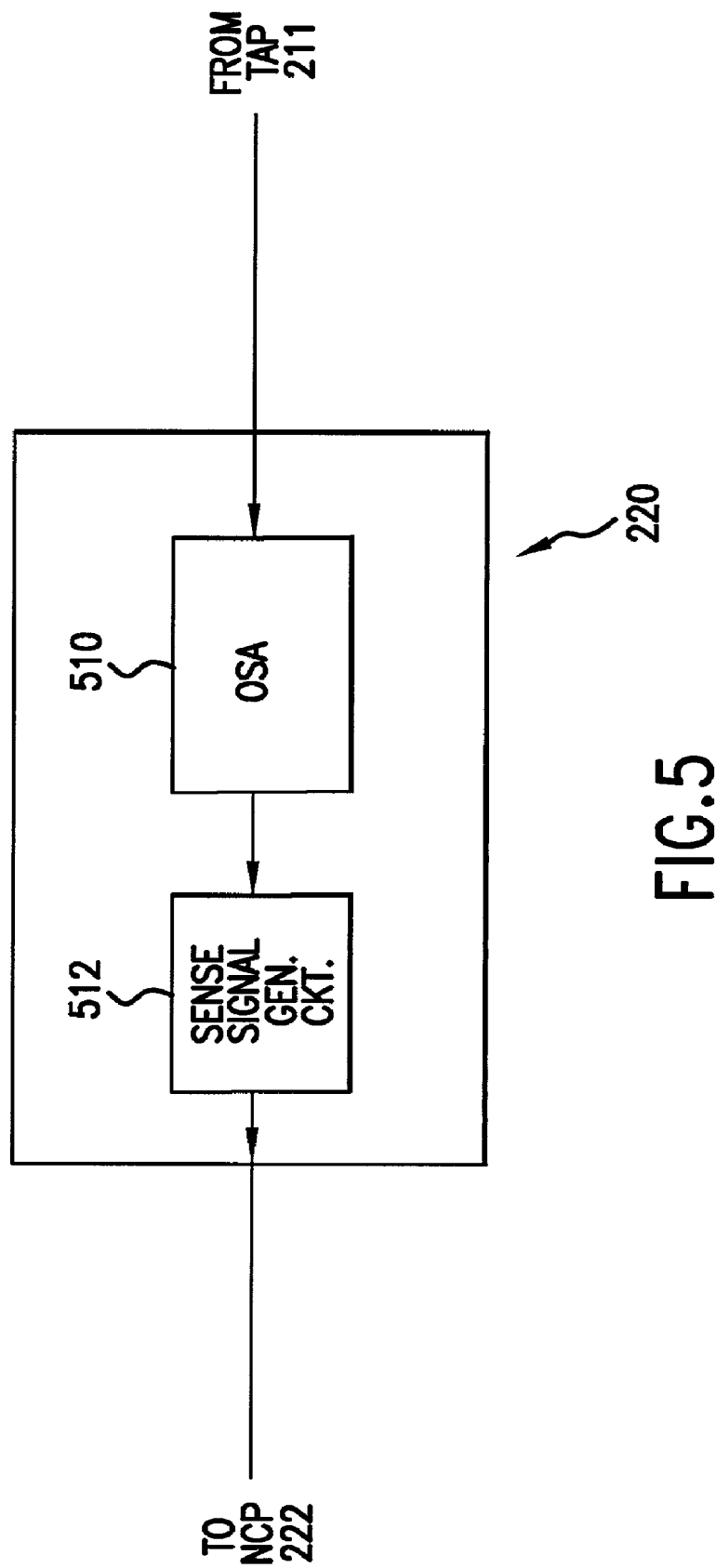
FIG. 5 illustrates an optical performance monitoring circuit consistent with the present invention.

After passing through optical amplifier 210-5 in sub-span 201, a portion of the WDM optical signal is supplied to OPM 220 via tap 211. As shown in FIG. 5, OPM 220 often includes an optical spectrum analyzer (OSA) circuit 510, which measures or senses the optical power or intensity spectrum associated with the WDM optical signal. OSA 510 outputs a measurement signal to sense signal generating circuit 512, which in turn supplies a sense signal to NCP 222. The sense signal typically carries information concerning one or more parameters associated with the measured spectrum. For example, the sense signal can include information concerning power levels associated with each optical signal within the composite WDM optical signal. Alternatively, the sense signal can include information concerning other parameters such as, optical to signal noise ratio (OSNR), Q (signal to noise ratio of an electrical signals generated by optical to electrical conversion of the optical signals) or bit error rate (BER) values for each optical signal. OPM 220 can further include known circuitry for generating the information concerning each of these parameters. An example of a system and method for obtaining signal-to-noise ratios in a WDM system can be found in U.S. Pat. No. 6,986,782, incorporated by reference herein.

Figure 10:
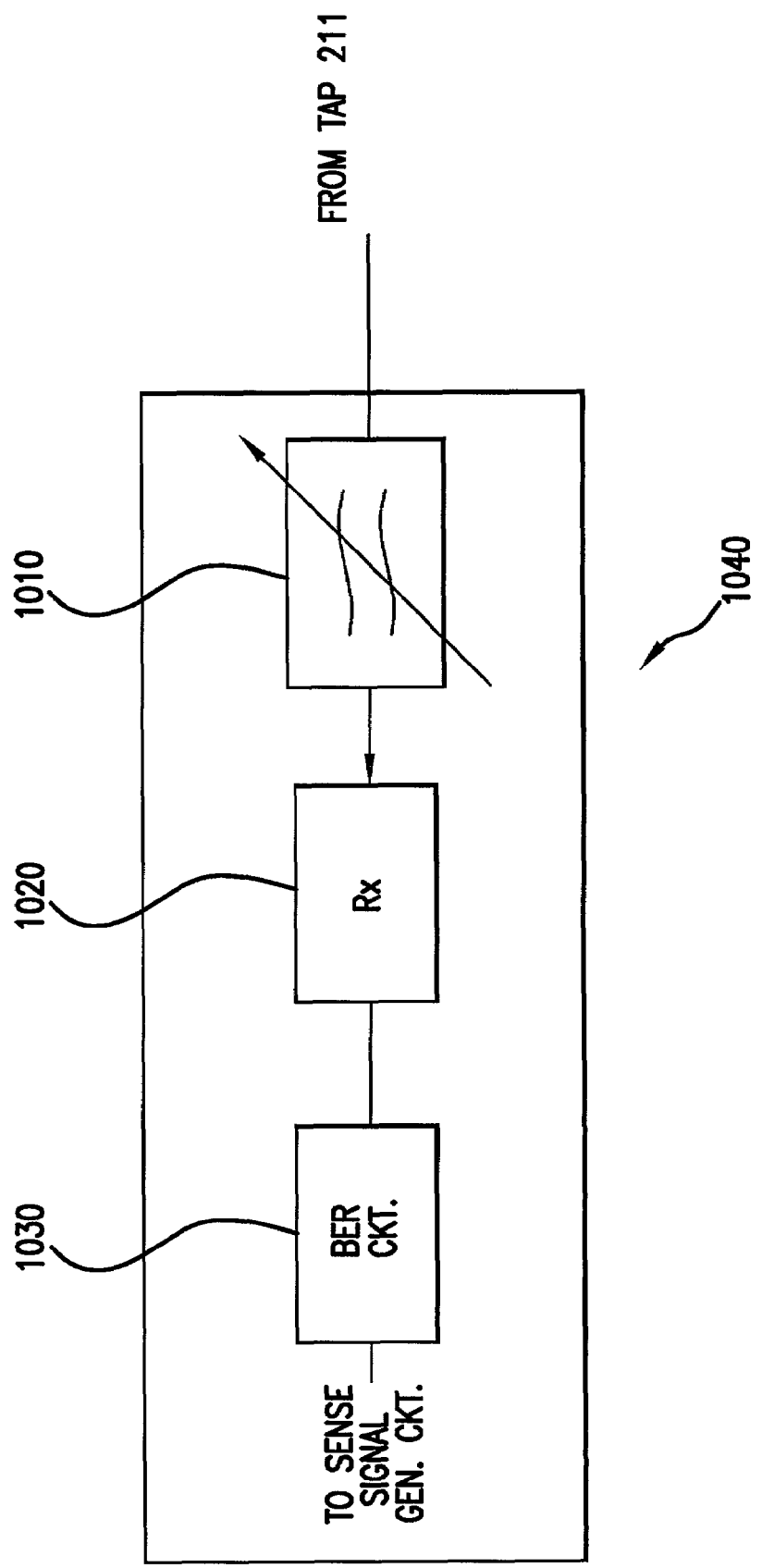
FIG. 10 illustrates a bit-error-rate (BER) measuring module for use in conjunction with a further embodiment of the present invention.

For example, as shown in FIG. 10, a BER measurement module 1040 includes a tunable filter 1010 that selectively passes individual channels to a receiver 1020. In response to a detected signal, receiver 1020 outputs an electrical signals to BER circuit 1030, which, in turn, supplies an output containing BER information to the sense signal generating circuit. Typically, tunable filter 1010 scans each optical signal or channel within the WDM signal so that BER information can be obtained at each wavelength. Alternatively, the input from tap 211 can be demultiplexed and receivers can be provided for each wavelength in the WDM signal.

Typically, there is a good correlation between increase in power level and increase in OSNR as the DGE function is enabled. The change in OSNR in dB is often half the change in power level. According to the simplest model based around the ASE noise, the change in Q in dB when the DGE function is enabled should vary as the change in OSNR in dB/ In practice the Q change is generally less than this. The reason is that increasing the power of an initially low power channel channel gives improved OSNR, but the channel may suffer from increased noise due to nonlinear impairments such as cross phase modulation and four wave mixing, effects which vary as the square of per-channel power. In experiments involving transmission over TrueWave Classic fiber, Q improvement in the worst channel was 1.3 dB. Similar results were obtain using non-dispersion shifted fiber (NDSF), with a Q improvement of 0.9 dB.

In response to information contained in the sense signal, NCP 222 generates control information, which is ultimately used to adjust DGE 214 to flatten the optical power of each optical signal within the WDM signal or otherwise achieve a desired power spectrum. OPM 232 has a similar structure as OPM 220 and operates in a similar fashion to supply control information to DGE 226 to adjust its transmission spectrum to equalize optical signals in sub-span 202 or obtain a desired power spectrum.

Figure 6:
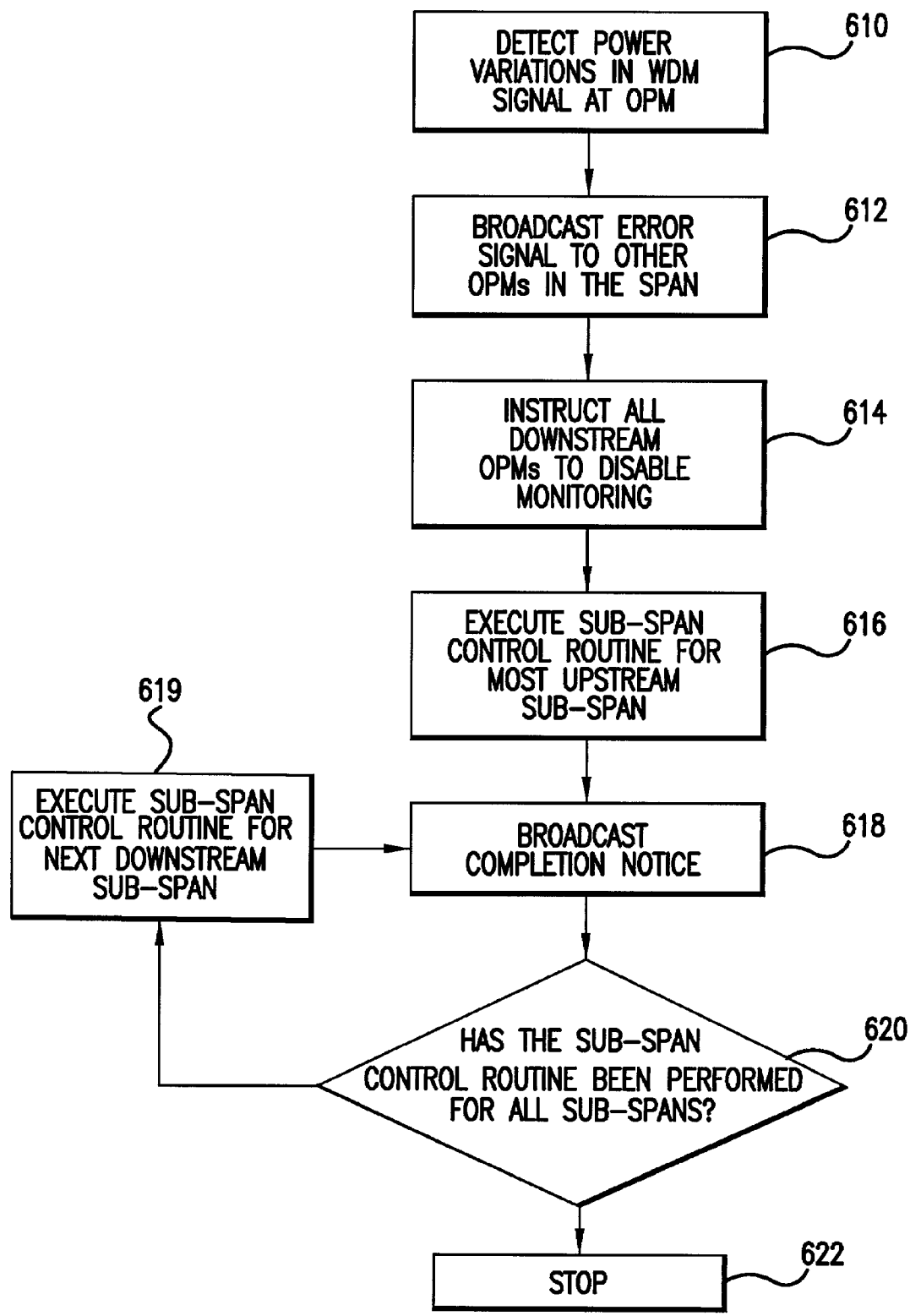
FIGS. 6 and 7 illustrates steps of a method for reducing ripple consistent with a feature of the present invention.

A communication method consistent with a further feature of the present invention in which OPMs and DGEs in multiple sub-spans cooperate to adjust optical signal powers to obtain a desired power spectrum will next be described with reference to FIGS. 2 and 6. The method, however, is applicable to WDM systems having any number of sub-spans, and not just two sub-spans, as shown in FIG. 2.

In a first step (step 610) of the method, optical signals having different wavelengths that make up a WDM optical signal are monitored at a first location (e.g., at tap 213), as well as at a second location (e.g., at tap 211) to detect power variations, for example, in the WDM optical signal. NCP 222 broadcasts an error signal to other NCPs coupled to optical communication paths 250 and 260 through the service channel (step 612). Instructions are next sent to NCP 234, through the service channel, to disable monitoring by OPM 232, as well as any other downstream OPMs. The NCP coupled to the most upstream OPM that has detected unacceptable power variations, in this instance NCP 222, begins execution of a control routine (step 616) to substantially equalize optical signal power levels in sub-span 201 or otherwise achieve a desired power spectrum (to be discussed in greater detail below) in the most upstream sub-span. Typically, however, regardless of which OPM detects high power variations, the NCP coupled to the most upstream OPM commences the control routine. Once the optical signal powers are determined to be sufficiently uniform or have the desired spectrum, NCP 222 broadcasts a completion notice through the service channel (step 618). Since the control routine must be performed for other sub-spans (step 620), the control routine is next performed by the next downstream sub-span (step 619) and a broadcast notice is broadcast to other NCPs (step 618) in connection with sub-span 202. NCPs coupled to OPMs in other downstream sub-spans perform steps 619 and 618 until the span control routine has been performed for each sub-span. Typically, the control routine is performed for each downstream sub-span in succession. Once the control routine has been carried out for each sub-span, no further control routines are performed (step 622).

Figure 7:
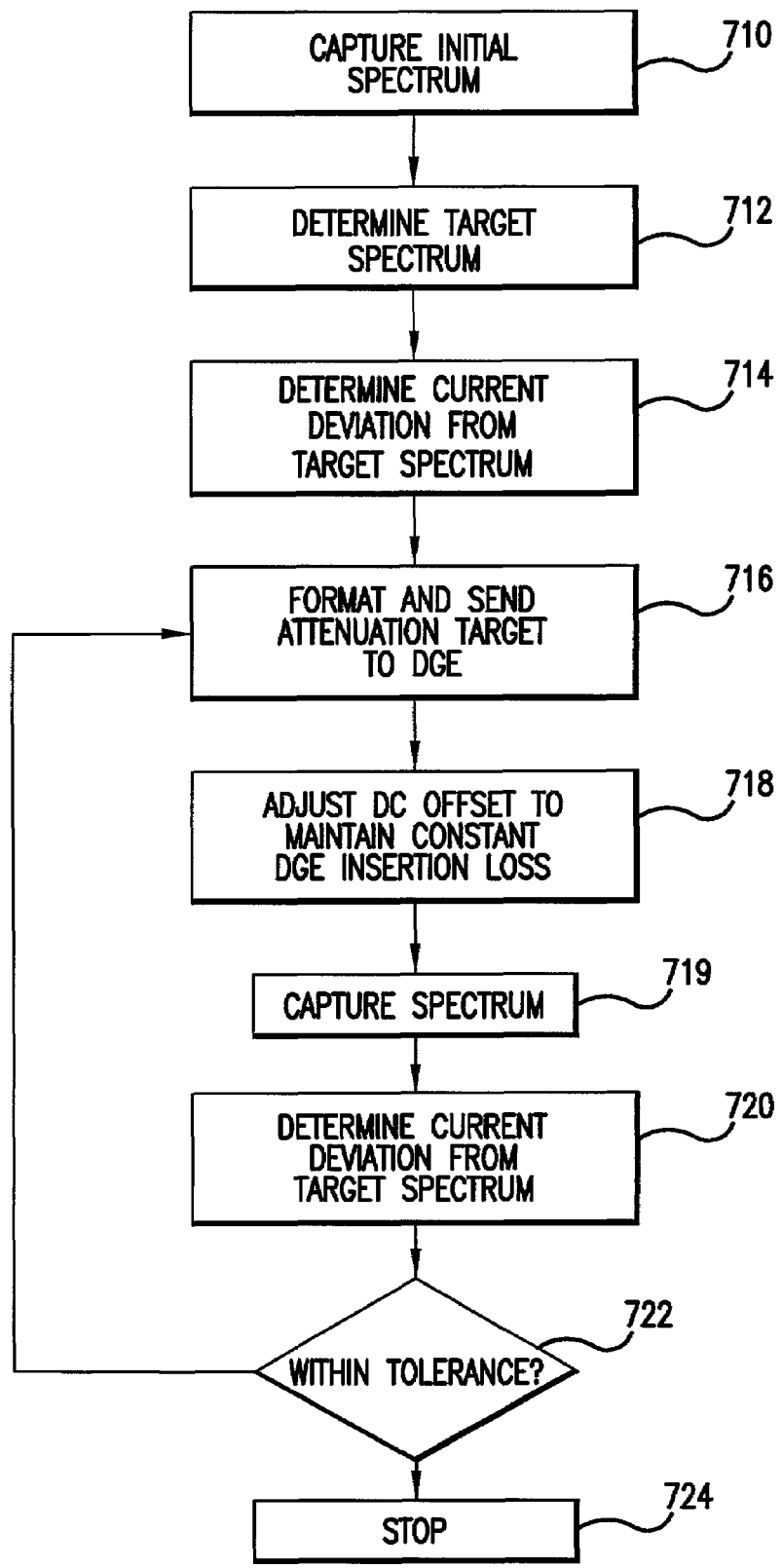

The control routine will next be described with reference to FIGS. 7 and 2. In step 710, the initial spectrum of the WDM optical signal is captured or measured by the OPM (e.g., OPM 220). The target or predetermined spectrum is then ascertained by NCP 222 (step 712), which also determines a difference or deviations from the target spectrum and the measured spectrum with respect to a given parameter, e.g., OSNR. Alternatively, the deviations can be determined by the OPM if appropriate circuitry is provided for carrying out this task. NCP 222 next appropriately formats and sends control information through the service channel to NCP 216, which outputs a control signal or attenuation target to DGE 214 to thereby adjust the transmission spectrum of the DGE, and alter a power associated with each of the optical signals in response to the deviation (steps 714 and 716). NCP 216 then adjusts the DC offset voltage applied to DGE 214 to obtain a constant insertion loss (step 718). In step 719, OPM 220 captures the WDM optical signal spectrum output from amplifier 210-5 (step 719) after propagating through the adjusted DGE, and NCP 222 determines the deviation between the measured optical signal powers and the target spectrum (step 720). If the measured deviation is within tolerance (step 722), the control routine stops (step 724). Otherwise steps 716, 718, 719 and 720 are repeated until the variation in optical signal powers is within a desired range.

In addition, the insertion loss of the DGE can be adjusted in response to a voltage, such as an offset voltage, such that, when combined with an optical amplifier, the resulting insertion loss of a module containing the two is substantially reduced. For example, the voltage can be controlled to adjust the insertion loss of the DGE, and the overall insertion loss of the module, to near zero.

As noted above, the control routine is repeated for successive sub-spans until the DGE in each sub-span has been adjusted to substantially equalize the power levels associated with the WDM optical signal or otherwise achieve a desired power spectrum.

As further noted above, control of the DGEs is performed in accordance with deviations or differences between a measured spectrum and a predetermined spectrum, with respect to OSNR or power. However, DGE control can be achieved based on other parameters, such as BER. Moreover, DGE control can alternate between control based on one parameter and control based on another parameter. In addition, DGE control in one sub-span can be achieved based on a given parameter, while DGE control in another sub-span can be accomplished based on the same or a different parameter in accordance with the method discussed above.

Figure 8:
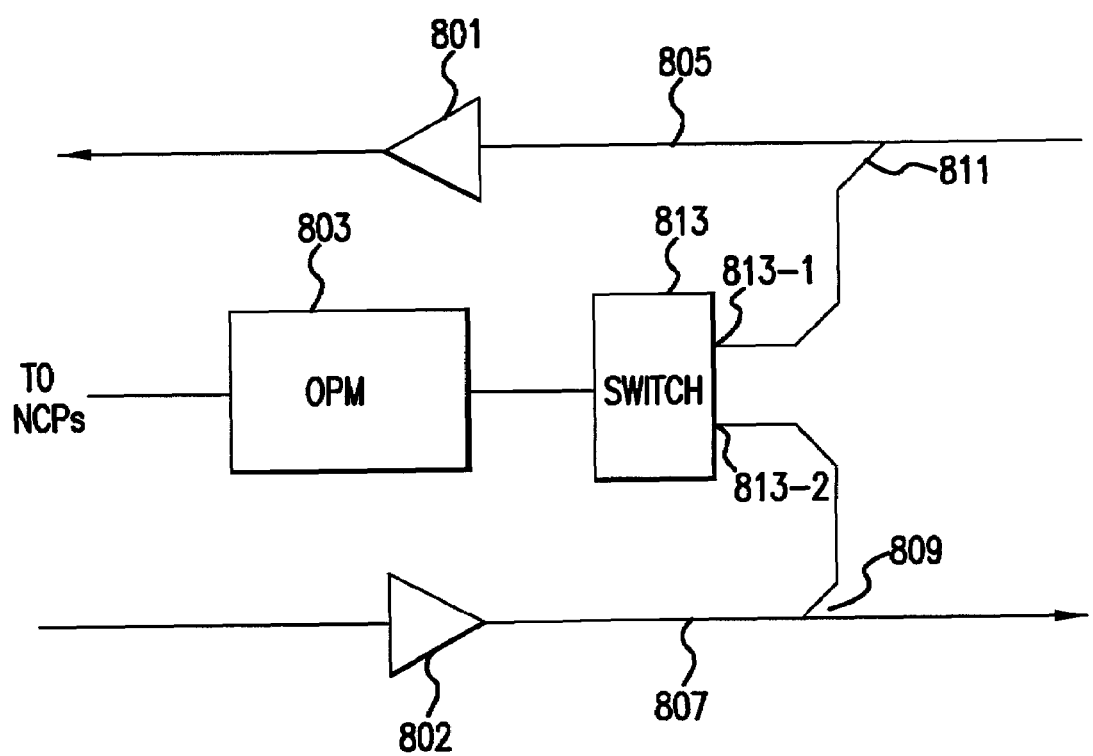
FIG. 8 illustrates a further embodiment of the present invention including a switch.

FIG. 8 illustrates an alternative embodiment in which OPM 803 can be shared by two sub-spans represented by triangles 801 and 802. Sub-spans 801 and 802 are similar to sub-span 201 discussed above in connection with FIG. 2. In the embodiment shown in FIG. 8, however, sub-span 801 carries optical signals propagating from right to left along optical communication path 805 in the drawing, while sub-span 802 carries optical signals propagating from left to right along optical communication path 807. Moreover, service channel modems and appropriate filters are provided along the sub spans to provide necessary service channel communication.

Optical signals are tapped from path 807 by coupler 809 and fed to a switch, such as optical switch 813, through input 813-2, while optical signals traveling along path 805 are supplied to switch 813 via coupler 811 through 813-1. Switch 813 selectively supplies optical signals to OPM 803, which, in turn, supplies sense signals to one or more NCPs. As noted above, the NCPs are coupled to control a corresponding DGE component in the sub-span through a service channel and other NCPs, or as discussed in greater detail below with respect to FIG. 9, through electrical signals supplied to the DGE without transmission through an intervening service channel. Typically, switch 813 will alternate between inputs 813-1 and 813-2 so that for a given time period optical signals from path 807 are supplied to OPM 803 and for a successive time period optical signals from path 805 are input to OPM 803. The outputs of OPM 803 are, in turn, selectively coupled to DGEs coupled to optical communication paths 805 and 807 in accordance with the optical signals selected by switch 813. As a result, sense signals generated in response to optical signals carried by optical communication path 805 are coupled to a DGE coupled to path 805, while sense signals output based on optical signals propagating along optical communication path 807 are coupled to a DGE coupled to path 807.

Figure 9:
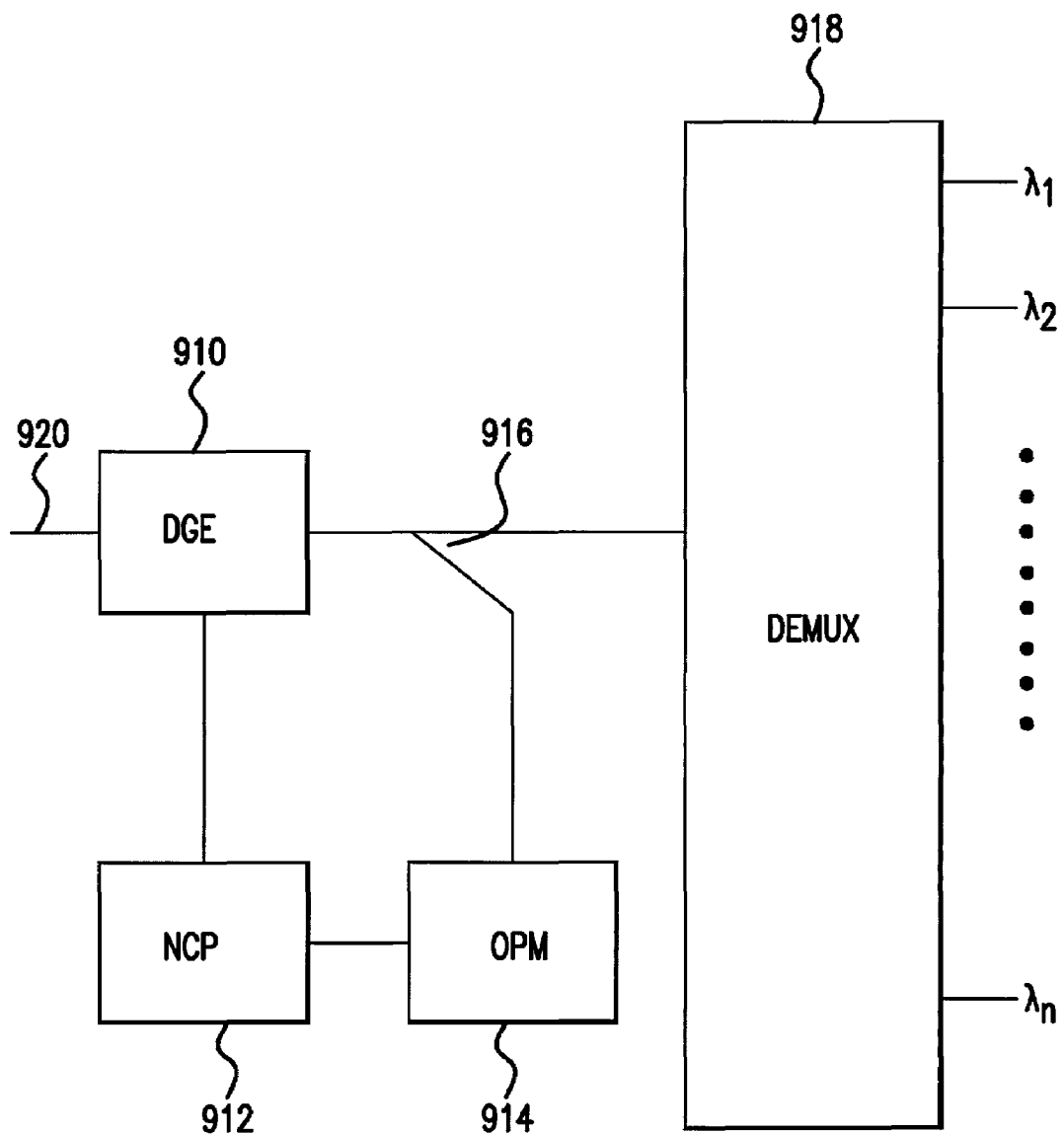
FIG. 9 illustrates an additional embodiment of the present invention in which a dynamic gain equalization circuit and optical performance monitoring circuit are substantially co-located.

FIG. 9 illustrates a further embodiment in which DGE 910 and OPM 914 are substantially co-located outside of an amplifier. In this example, the DGE and OPM are positioned adjacent demultiplexer 918 at the receive end in a WDM system, but it is understood that the DGE and OPM can be positioned at any appropriate location along a span of sub-span, including adjacent multiplexer 112 in FIG. 1. Optical signals traveling along optical communication path 920 are tapped by coupler 916 and fed to OPM 914 having a similar, if not the same construction of OPM 220 discussed above in connection with FIG. 2. OPM 914 supplies a sense signal to NCP 912, which then supplies a control signal for adjusting DGE 910 so that the optical signals can be adjusted to have a desired power spectrum. After passing through DGE 910, the optical signals are output to demultiplexer 918, similar to if not the same as demultiplexer 116, for separating the WDM optical signal into individual optical signals, each having a corresponding one of wavelengths $\lambda_1$ to $\lambda_n$.

While the foregoing invention has been described in terms of the embodiments discussed above, numerous variations are possible. Accordingly, modifications and changes such as those suggested above, but not limited thereto, are considered to be within the scope of the following claims.

What is claimed is:

1. An optical communication device, comprising:
   a dynamic gain equalization circuit coupled to an optical communication path, said optical communication path being configured to carry a plurality of optical signals, each of which being at a respective one of a plurality of wavelengths, said dynamic gain equalization circuit having an adjustable, wavelength dependent transmission spectrum, at least a portion of said transmission spectrum having a substantially non-uniform slope;
   an optical amplifier coupled to said optical communication path, and being configured to impart optical amplification to said plurality of wavelengths; and
   an optical performance monitoring circuit coupled to said optical communication path, said optical performance monitoring circuit being configured to sense said plurality of optical signals and generate a sense signal in response thereto, said transmission spectrum being adjusted in response to said sense signal.

2. An optical communication device in accordance with claim 1, wherein said dynamic gain equalization circuit is spaced from said optical performance monitoring circuit along said optical communication path.

3. An optical communication device in accordance with claim 1, wherein said dynamic gain equalization circuit and said optical performance monitoring circuit are substantially co-located.

4. An optical communication device in accordance with claim 3, further comprising an optical demultiplexer, said optical demultiplexer being coupled to said optical communication path adjacent said optical performance monitoring circuit.

5. An optical communication device in accordance with claim 1, further comprising a dispersion compensating element coupled to said optical communication path.

6. An optical communication device in accordance with claim 5, wherein said dispersion compensating element includes dispersion compensating fiber.

7. An optical communication device in accordance with claim 1, further comprising a variable optical attenuator coupled to said optical communication path.

8. An optical communication device in accordance with claim 1, said optical amplifier further comprising:
   a first amplification stage being configured to impart a first optical gain to said plurality of optical signals; and
   a second amplification stage being configured to impart a second optical gain to said plurality of optical signals, said dynamic gain equalizing circuit being configured to receive an output from said first amplification stage and supply an output to said second amplification stage.

9. An optical communication device in accordance with claim 8, said optical amplifier further comprising:
   a third amplification stage being configured to impart a third optical gain, said third amplification stage being coupled to said first and second amplification stages.

10. An optical communication device in accordance with claim 1, further comprising an optical filter coupled to said optical communication path.

11. An optical communication device in accordance with claim 1, further comprising:
    a service channel emitter coupled to said optical performance monitoring circuit, said service channel emitter being configured to supply a service channel optical signal carrying control information; and
    a service channel receiver circuit configured to receive said service channel optical signal and being coupled to said dynamic gain equalization circuit, said dynamic gain equalization circuit being configured to adjust said transmission spectrum consistent with said control information.

12. An optical communication device in accordance with claim 11, wherein said optical communication path is a first optical communication path, and said service channel emitter being configured to supply said service channel optical signal to a second optical communication path, said service channel receiver circuit being configured to receive said service channel optical signal from said second optical communication path.

13. An optical communication device in accordance with claim 1, wherein said optical performance monitoring circuit includes an optical spectrum analyzer circuit, said optical spectrum analyzer circuit being configured to measure an intensity level associated with each of said plurality of optical signals, said sense signal being generated in response to said measured intensity level associated with each of said plurality of optical signals.

14. An optical communication device in accordance with claim 1, wherein said optical performance monitoring circuit includes an optical spectrum analyzer circuit.

15. An optical communication device in accordance with claim 1, wherein said optical performance monitoring circuit includes an optical spectrum analyzer circuit, said optical spectrum analyzer circuit being configured to measure an optical-to-signal noise ratio (OSNR) associated with each of said plurality of optical signals, said sense signal being generated in response to said measured OSNR associated with each of said plurality of optical signals.

16. An optical communication system, comprising:
a plurality of optical signal emitters, each of which outputting a respective one of a plurality of optical signals, each of said plurality of optical signals being at a respective one of a plurality of wavelengths;
an optical combiner having a plurality inputs and an output, each of said plurality of inputs being coupled to a respective one of said plurality of optical signal emitters, said optical combiner being configured to supply said plurality of optical signals onto an optical communication path coupled to said output of said combiner;
a first group of optical amplifiers coupled to a first section of said optical communication path;
a second group of optical amplifiers coupled to a second section of said optical communication path;
a first dynamic gain equalization circuit coupled to said first section of said optical communication path, said first dynamic gain equalization circuit having a first adjustable, wavelength dependent transmission spectrum, at least a portion of said transmission spectrum having a substantially non-uniform slope;
a second dynamic gain equalization circuit coupled to said second section of said optical communication path, said second dynamic gain equalization circuit having a second adjustable, wavelength dependent transmission spectrum, at least a portion of said transmission spectrum having a substantially non-uniform slope;
a first optical performance monitoring circuit coupled to said first section of said optical communication path, said first optical performance monitoring circuit being configured to sense said plurality of optical signals and generate a first sense signal in response thereto, said first transmission spectrum being adjusted in response to said sense signal; and
a second optical performance monitoring circuit coupled to said second section of said optical communication path, said second optical performance monitoring circuit being configured to sense said plurality of optical signals and generate a second sense signal in response thereto, said second transmission spectrum being adjusted in response to said sense signal.

17. An optical communication system in accordance with claim 16, wherein said first group of optical amplifiers are provided in series along said first portion of said optical communication path, said first dynamic gain equalization circuit is provided adjacent one of said first group of optical amplifiers, said one of said first group of optical amplifiers being provided between two of said first group of optical amplifiers.

18. An optical communication system in accordance with claim 17, wherein said second group of optical amplifiers are provided in series along said second portion of said optical communication path, said second dynamic gain equalization circuit is provided adjacent one of said second group of optical amplifiers, said one of said second group of optical amplifiers being provided between two of said second group of optical amplifiers.

19. An optical communication method, comprising:
measuring a spectrum associated with a wavelength division multiplexed (WDM) signal comprised of a plurality of optical signals carried on an optical communication path, each of said optical signals being at a respective one of a plurality of wavelengths;
determining a difference between said measured spectrum and a predetermined spectrum with respect to a parameter associated with said plurality of optical signals; and
performing dynamic gain equalization on the WDM signal by adjusting a power associated with each of said plurality of optical signals in response to said difference,
wherein said measuring step is a first measuring step in connection with said plurality of optical signals carried by a first section of said optical communication path, said method further comprising:
performing a second measuring step to measure a spectrum associated with a plurality of optical signals carried by a second section of said optical communication path, said first section being upstream from second section relative to a direction of propagation of said plurality of optical signals in said optical communication path; and
disabling said measuring at said second section during said step of adjusting.

20. An optical communication method in accordance with claim 19, wherein said parameter is an optical-to-signal noise ratio (OSNR).

21. An optical communication method in accordance with claim 19, wherein said parameter is a bit error rate (BER).

22. An optical communication method in accordance with claim 19, wherein said parameter is an intensity associated with each of said plurality of optical signals.

23. An optical communication method in accordance with claim 19, wherein said parameter is a first parameter and said difference is a first difference, said method further comprising:
determining a second difference between said measured spectrum and a predetermined spectrum with respect to a second parameter associated with said plurality of optical signals; and
adjusting a power associated with each of said plurality of optical signals in response to said second difference.

24. An optical communication method in accordance with claim 19, further comprising performing additional measuring and determining steps after said adjusting step.

25. An optical communication method in accordance with claim 24, further comprising attenuating said power-adjusted plurality of optical signals.

26. An optical communication method in accordance with claim 19, further comprising amplifying said plurality of optical signals.

27. An optical communication method in accordance with claim 19, wherein said determining step is a first determining step, and said adjusting step is a first adjusting step, said parameter is a first parameter, said method further comprising:
performing a second determining step to determine a difference between said second measured spectrum and another predetermined spectrum with respect to a second parameter associated with said plurality of optical signals traversing a second section of said optical communication path; and performing a second adjusting step to adjust a power associated with each of said plurality of optical signals traversing said second section of said optical communication path in response to said difference between said second measured spectrum and said another predetermined spectrum.

28. An optical communication method in accordance with claim 27, wherein said first and second parameters are the same.

29. An optical communication method in accordance with claim 27, wherein said first and second parameters are different.

30. An optical communication method in accordance with claim 19, wherein said parameter is a Q value.

31. An optical communication method, comprising the steps of:

monitoring a plurality of optical signals propagating on an optical communication path, each of said plurality of optical signals being at a respective one of a plurality of wavelengths, said first monitoring occurring at a first location along said optical communication path;

further monitoring said plurality of optical signals at a second location along said optical communication path remote from said first location;

detecting the presence of variation in power levels associated with said plurality of optical signals at said first and second locations in response to said monitoring and further monitoring, respectively;

adjusting said power levels at a third location along said optical communication path remote from said first and second locations to thereby offset at least a portion of said variation in said power levels; and further adjusting said power levels at a fourth location along said optical communication path, said fourth location being remote from said first, second and third locations.

32. An optical communication method in accordance with claim 31, wherein said first location is upstream from second location relative to a direction of propagation of said plurality of optical signals in said optical communication path, said method further comprising:

disabling said further monitoring at said second location during said adjusting step; and further adjusting said power levels at a fourth location along said optical communication path, said fourth location being remote from said first, second and third locations.

33. An optical communication method in accordance with 31, wherein said adjusting step further includes non-uniformly adjusting said power levels in accordance with said plurality of wavelengths.

34. An optical communication device, comprising:

a dynamic gain equalization circuit coupled to an optical communication path, said optical communication path being configured to carry a plurality of optical signals, each of which being at a respective one of a plurality of wavelengths, said dynamic gain equalization circuit having an adjustable, wavelength dependent transmission spectrum, at least a portion of said transmission spectrum having a substantially non-uniform slope;

an optical amplifier coupled to said optical communication path, and being configured to impart optical amplification to said plurality of wavelengths, said dynamic gain equalization circuit adjusting said transmission spectrum to attenuate wavelengths not populated by information-carrying channels to thereby attenuate amplified spontaneous emission (ASE) light carried by said optical communication path.

35. An optical communication device, comprising:

a plurality of optical amplifiers coupled in series to an optical communication path, a first one of said plurality of optical amplifiers being positioned nearer a first end portion of said optical communication path than other ones of said plurality of optical amplifiers and a second one of said plurality of optical amplifiers, and said second one of said plurality of optical amplifiers being positioned nearer a second end portion of said optical communication path than said other ones of said plurality of optical amplifiers and said first one of said plurality of optical amplifiers; and a dynamic gain equalization circuit coupled to a third one of said plurality of optical amplifiers, said third one of said plurality of optical amplifiers being disposed along said optical communication path between said first and second ones of said plurality of optical amplifiers wherein each of said optical amplifiers is a multi-stage optical amplifier.

36. An optical communication device in accordance with claim 35, wherein said third optical amplifier is centrally disposed along said optical communication path between said first and second ones of said plurality of optical amplifiers.

37. An optical communication device in accordance with claim 35, further comprising:

a plurality of optical transmitters each of which outputting a respective one of a plurality of optical signals, each of said plurality of optical signals having a respective one of a plurality of wavelengths;

an optical multiplexer coupled to said optical transmitters, said optical multiplexer being configured to supply said plurality of optical signals to said optical communication path;

an optical demultiplexer having an input coupled to said optical communication path and a plurality of outputs, said optical demultiplexer supplying corresponding ones of said plurality of optical signals to corresponding ones of said plurality of outputs of said optical demultiplexer, and a plurality of optical receiver circuits, each of which being coupled to a respective one of said plurality outputs of said optical demultiplexer.

38. An optical communication device, comprising:

first, second and third optical amplifiers coupled to an optical communication path, said first optical amplifier being located nearer a first end portion of said optical communication path than said second and third optical amplifiers, said second optical amplifier being located nearer a second end portion of said optical communication path than said first and third optical amplifiers, and said third optical amplifier being located between said first and second optical amplifier; and a dynamic gain equalization circuit coupled to said third optical amplifier, wherein each said first, second, and third optical amplifiers is a multi-stage optical amplifier.

* * * * *